United States Patent [19]
Reichert et al.

[11] Patent Number: 5,549,988
[45] Date of Patent: Aug. 27, 1996

[54] POLYMER ELECTROLYTES AND ELECTROCHEMICAL CELLS USING SAME

[75] Inventors: Veronica R. Reichert, Sunrise; Ganesh Venugopal, Plantation; Florence O. Eschbach, Sunrise, all of Fla.

[73] Assignee: Motorola, Inc., Schaumburg, Ill.

[21] Appl. No.: 402,426

[22] Filed: Mar. 10, 1995

[51] Int. Cl.⁶ ............... H01M 6/18; H01M 6/22
[52] U.S. Cl. ........................ 429/192; 429/206
[58] Field of Search ................... 429/190, 192, 429/204, 198, 206; 252/62.2; 361/523, 525, 526, 524; 29/25.42, 25.03

[56] References Cited

U.S. PATENT DOCUMENTS

| | | | |
|---|---|---|---|
| 3,708,220 | 1/1973 | Meyers et al. | 350/160 R |
| 3,765,950 | 10/1973 | Lauck | 429/190 |
| 4,121,022 | 10/1978 | Dick et al. | 429/264 |
| 4,168,352 | 9/1979 | Dick et al. | 429/204 |
| 4,563,404 | 1/1986 | Bahary | 429/206 |
| 4,778,737 | 10/1988 | Sehm | 429/206 |
| 5,166,008 | 11/1992 | Tomida et al. | 429/190 |
| 5,433,892 | 7/1995 | Czech | 252/62.2 |

FOREIGN PATENT DOCUMENTS 5204197 of 1993 Japan.

OTHER PUBLICATIONS

F. Buchholz Trip, vol. 8, Aug., 1994 pp. 277–281 Recent Advances in Superabsorbent Polyacrylates.

*Primary Examiner*—Stephen Kalafut
*Assistant Examiner*—Carol Chaney
*Attorney, Agent, or Firm*—Kenneth M. Massaroni

[57] ABSTRACT

An electrolyte system (40) for use in connection with an electrochemical cell (10). The cell (10) includes a positive (20) and a negative (30) electrode, and an electrolyte system (40) disposed therebetween. The electrolyte system includes a polymer matrix fabricated of a polyacrylic acid or polyacrylic acid derivative polymeric material. The polymer material is adapted to engage in electroactive species. Examples of electroactive species may be either an acid or a base electrolyte, such as KOH or $H_2SO_4$. +EA

9 Claims, 2 Drawing Sheets

POLYMER ELECTROLYTES AND ELECTROCHEMICAL CELLS USING SAME

TECHNICAL FIELD

This invention relates in general to the field of electrolytes for electrochemical cells and more particularly to polymer electrolytes for such cells.

BACKGROUND OF THE INVENTION

There has been a great deal of interest in developing better and more efficient methods for storing energy for applications such as radio communication, satellites, portable computers, and electric vehicles to name but a few. Accordingly, there has been recent concerted efforts to develop high energy, cost effective batteries and/or electrochemical capacitors having improved performance characteristics.

Rechargeable or secondary cells are more desirable than primary (non-rechargeable) cells since the associated chemical reactions which take place at the positive and negative electrodes of the battery are reversible. Electrodes for secondary cells are capable of being regenerated (i.e., recharged) many times by the application of an electrical charge thereto. Numerous advanced electrode systems have been developed for storing electrical charge. Concurrently, much effort has been dedicated to the development of electrolytes capable of enhancing the capabilities of electrochemical cells.

Heretofore electrolytes have been either liquid electrolytes as found in conventional wet cell batteries or solid films as are available in newer, more advanced battery systems. Each of these systems have advantages, though they have inherent limitations which make them unsuitable for particular applications. Liquid electrolytes, while demonstrating acceptable ionic conductivity, tend to leak out of the cells in which they are sealed. While better manufacturing techniques have lessened the occurrence of leakage, cells still do leak potentially dangerous liquid electrolytes from time to time. Moreover, any leakage in the cell lessens the amount of electrolyte available to the cell, thus reducing the effectiveness of the cell.

Conversely, solid electrolytes are free from problems of leakage. However, they have vastly inferior properties as compared to liquid electrolytes. For example, conventional solid electrolytes have ionic conductivities in the range of $10^{-5}$S/cm whereas acceptable ionic conductivity is typically greater than about $10^{-3}$S/cm. Good ionic conductivity is necessary to ensure a battery system capable of delivering usable amounts of power for a given application. Good conductivity is necessary for the high rate operation demanded by, for example, cellular telephones and satellites. Accordingly, solid electrolytes are not yet adequate for many high performance battery systems.

One solution which has been proposed relates to the use of gel electrolytes for electrochemical systems. These types of electrolytes have not been entirely successful as they tend to dissolve in the electrolyte solvent, thus losing mechanical integrity. As mechanical integrity is lost, the conductivity of the solution is compromised and hence performance of the electrochemical cell is degraded. Moreover, as the gel loses mechanical integrity, it becomes a liquid, and is once again subjected to the problem of leakage.

Accordingly, there exists a need for a new electrolyte system which combines the mechanical stability and freedom from leakage offered by solid electrolytes, with a high ionic conductivity characteristic of aqueous, liquid electrolytes.

DETAILED DESCRIPTION OF THE PREFERRED EMBODIMENT

Figure 1:
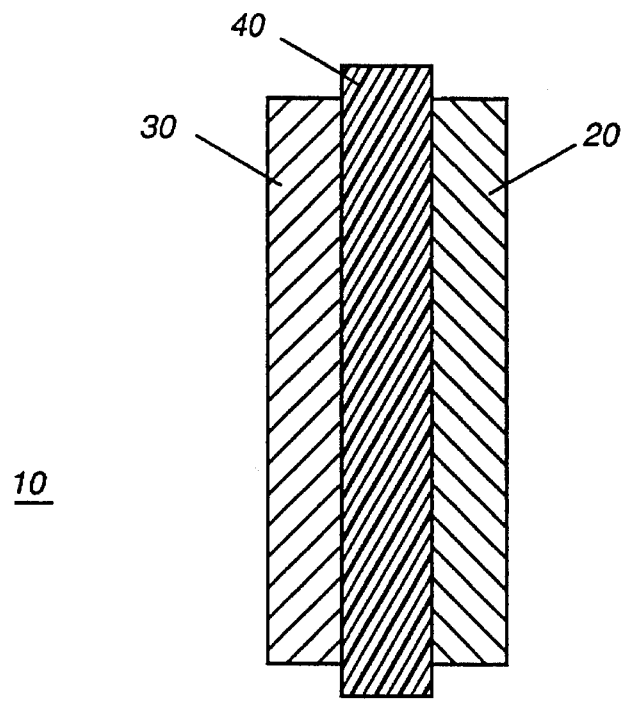
FIG. 1 is a schematic representation of an electrochemical cell in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of an electrochemical cell (10) in accordance with the instant invention. The cell (10) may be either an electrochemical capacitor device or a battery device. The cell (10) includes positive electrode (20) and negative electrode (30). According to battery industry convention, the cathode is defined as the positive electrode and the anode is defined as the negative electrode during the discharge process. The roles are reversed during the charging process. Thus, references herein to the positive electrode and the "cathode" refer to the electrode serving as the cathode during discharge. Similarly, references herein to the negative electrode or the "anode" refer to the electrode serving as the anode during discharge.

The positive electrode (20) may be fabricated of any of a number of chemical systems known to those of ordinary skill in the art. Examples of such systems include but are not limited to nickel or nickel alloys, its oxides and hydroxides, silver, its oxides, hydroxides and combinations thereof. The negative electrode (30) may likewise be fabricated from any of a number of electrode materials known to those of ordinary skill in the art. Selection of the negative electrode materials depend upon the selection of the positive electrode so as to insure an electrochemical cell which will function properly for a given application. In this context the negative electrode may be fabricated from, for example, zinc, bismuth, antimony, their oxides, and combinations thereof.

As a further illustration, the simplified reversible charge/discharge reactions for a zinc/nickel oxide system are as follows:

Charge

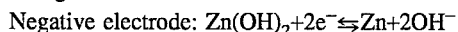

Negative electrode: $Zn(OH)_2 + 2e^- \rightleftharpoons Zn + 2OH^-$

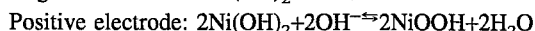

Positive electrode: $2Ni(OH)_2 + 2OH^- \rightleftharpoons 2NiOOH + 2H_2O$

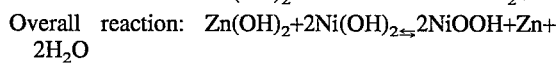

Overall reaction: $Zn(OH)_2 + 2Ni(OH)_2 \rightleftharpoons 2NiOOH + Zn + 2H_2O$

Operatively disposed between the positive (20) and the negative (30) electrodes is an electrolyte system (40). The electrolyte system (40) comprises a poly(acrylic acid) polymer matrix or a poly(acrylic acid) derivative polymer matrix, and an electrochemically active species. The electrochemically active species may be a liquid electrolyte adapted to promote ion transport between said positive (20) and said negative (30) electrodes. The electrolyte system (40) is hence adapted to act as an electronic insulator between the electrodes, but an ionic conductor to facilitate the electrochemical reaction.

The liquid electrolyte is engaged or absorbed by the polymer matrix and is selected to optimize the performance of the positive (20) and negative (30) electrode couple. The liquid electrolyte absorbed by the polymer matrix is typically a solution of an alkaline metal salt or combination of salts dissolved in a non-organic solvent or solvents. Typical alkaline metal salts include but are not limited to, salts having the formula $M^+X^-$ wherein $M^+$ is an alkaline cation such as lithium, sodium, or potassium, and combinations thereof and X is a anion such as chorine, bromine, iodine, $OH^-$, $NO_3^-$ and combinations thereof. Alternatively, the liquid electrolytes dissolved by the polymer matrix may be a protonic acidic solution examples of which include sulfuric acid, hydroboric acid, hydrochloric acid, phosphoric acid and combinations thereof.

The polymeric matrix which engages the liquid electrolyte may be fabricated of polyacrylic acid or polyacrylic acid derivative. Specific examples of these materials include, for example, polyacrylic acid, polyacrylamide-CO-acrylic acid, polyacrylamide, polyacrylamide cross-linked by N,N'-methylene-bis-acrylamide, poly(2-hydroxyethyl methacrylate), poly(2-hydroxypropyl methacrylate), poly(2-hydroxybutyl methacrylate), poly(2-hydroxyethyl methacrylate) cross-linked by ethylene glycol dimethylacrylate and combinations thereof.

The advantage of polyacrylic acid electrolyte matrices is that such materials are generally fabricated as free standing films, thus making possible a number of fabrication options. Moreover, the polymers remain chemically stable over time in the presence of both acidic and basic electrolyte species such as KOH and $H_2SO_4$.

One example of a material useful as the polymer matrix in the instant invention is polyacrylamide (PAAM), the chemical/physical stability of which can be improved by chemical crosslinking. The amide side groups present in PAAM may undergo hydrolysis in the presence of a strong base or acid but the main chain of the polymer is not affected by these chemicals. Films that contain acid or base remain clear and maintain the mechanical integrity over time. The mechanism by which the polyacrylamide polymer engages, for example, a potassium hydroxide (KOH) electrolyte can be described by the following formula:

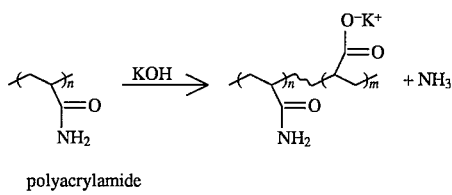

polyacrylamide where n and m are respective units.

Alternatively, poly(2-hydroxylethylmethacrylate) hereinafter "PHEMA" can be used as a matrix for the liquid electrolyte species. The main chain of this polymer is unaffected by acids or bases. The mechanical integrity of PHEMA films which contain acid or base does not change over time. The chemical structure of PHEMA crosslinked by ethylene glycol dimethacrylate is shown hereinbelow.

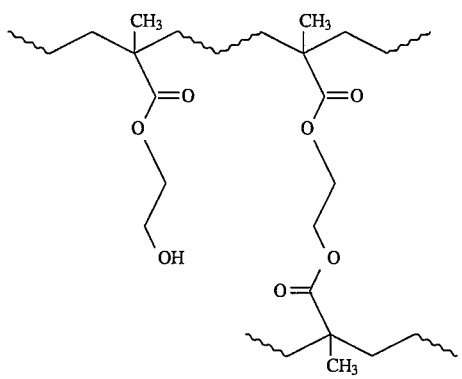

The following examples are intended to illustrate the advantages of the instant invention and are not intended to be limitations thereof.

EXAMPLES

Example 1

A solution of polyacrylamide was prepared by mixing 2 g of commercially available PAAM with 2 g of a 30 wt% KOH solution and 100 g of distilled water. The mixture was stirred until the PAAM was completely dissolved. PAAM film was prepared by pouring 10 ml of the solution onto a substrate. The water was allowed to evaporate until a free-standing, clear film was obtained. The ionic conductivity of this flexible film as tested by ac impedance was 0.05 S/cm.

Figure 2:
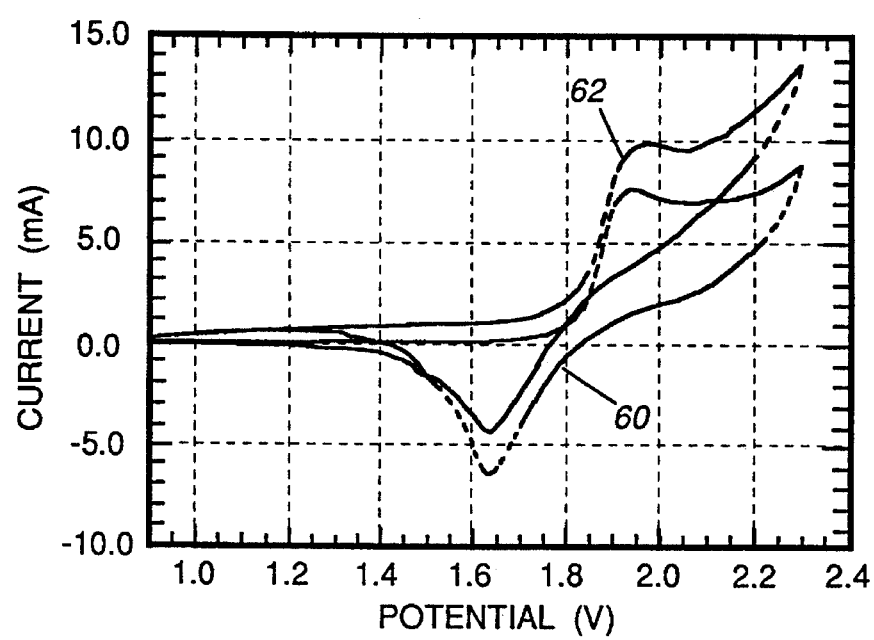
FIG. 2 is a cyclic voltammagram of an electrochemical cell including an electrolyte system in accordance with the instant invention.

An electrochemical device was fabricated by cutting a piece of the PAAM electrolyte gel. The sample had a thickness of approximately 0.15 mm and was approximately 1 cm². The electrolyte film was sandwiched between a metallic zinc electrode and a nickel alloy electrode, and sealed in a T-cell type device. The device was then cycled between 1.0 volts and 2.50 volts at a scan rate of 100 mV/s. Referring now to FIG. 2, there is illustrated therein a cyclic voltammagram taken after the second (line 60) and the fiftieth cycle (line 62) for the electrochemical charge storage device incorporating the polyacrylamide/electrolyte system of the instant invention. As may be appreciated from a perusal of FIG. 2, the device demonstrated the charge of approximately 15 millicoulomb after the second cycle and approximately 13 millicoulomb per cm² after the fiftieth.

Example 2

Figure 3:
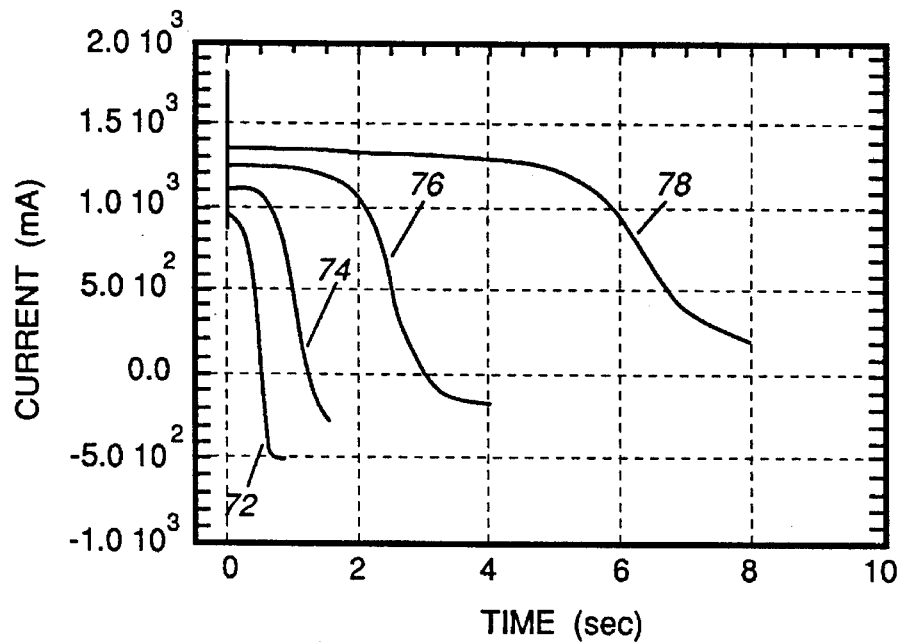
FIG. 3 is a series of charge/discharge curves for an electrochemical cell including an electrolyte system in accordance with the instant invention.

A polyacrylamide/KOH electrolyte system as described hereinabove in connection with Example 1 was prepared. A 1.6 cm² piece of polymeric electrolyte system was prepared and placed between a composite silver electrode and a zinc metal electrode. It is then sealed in a t-cell type device. Referring now to FIG. 3, there is illustrated therein the discharge curves for a device according to this Example 2 taken at various currents. Specifically, line 72 illustrates the discharge curves at 200 milliamps, line 74 illustrates the discharge curve at 100 milliamps, line 76 illustrates the discharge curve at 50 milliamps, and line 78 illustrates the discharge curve at 20 milliamps. FIG. 3 illustrates that electrochemical cells including the instant electrolyte system are capable of performing at relatively high current levels required of many applications.

Example 3

Poly(2-hydroxyethylmethacrylate), ("PHEMA"), gels were prepared by polymerizing a mixture of monomer and crosslinking agent (2-hydroxyethyl methacrylate and ethylene glycol dimethacrylate in a 9:1 ratio by weight) in the presence of 0.2% wt% of azobisisobutyronitrile (AIBN) free radical initiator at 80° C. for 12 hours lending a network structure.

The resulting, clear, brittle film was swollen with 30% KOH solution to give transparent flexible films with ionic conductivity of 0.04 S/cm. The crosslinked acrylate films also swelled in the presence of 5M sulfuric acid to give flexible, free-standing films with ionic conductivity of 0.066 S/cm as measured by AC impedance.

Figure 4:
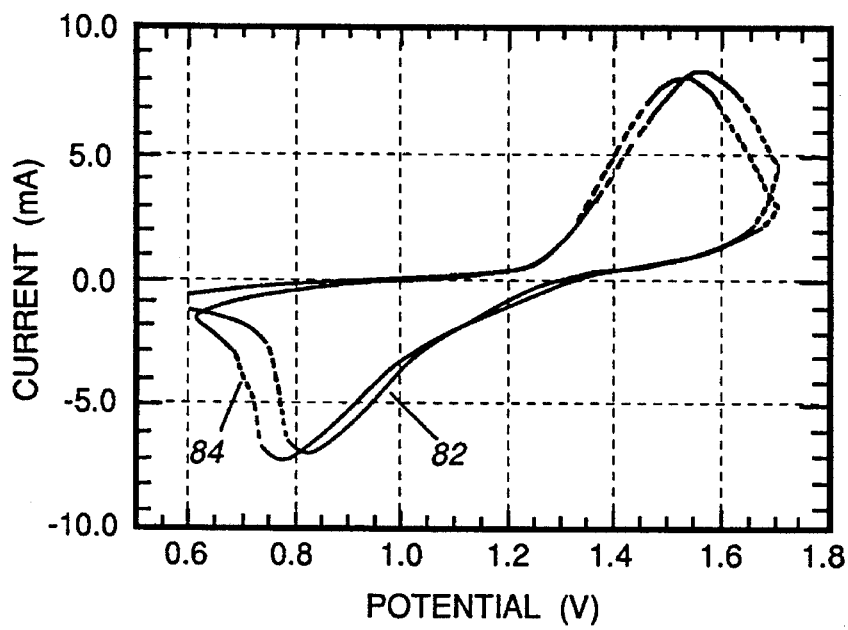
FIG. 4 is a cyclic voltammagram for an electrochemical including an electrolyte system in accordance with the instant invention.

A PHEMA gel film containing 46 wt% of a 30% KOH solution was cut to size and placed between a nickel alloy electrode and an antimony-bismuth electrode and sealed in t-cell type device. The cell was cycled between 0.60 V and 1.70 V and maintained a charge of 50 mC/cm$^2$ before and after constant current charging for 200 cycles. These results are illustrated herein in FIG. 4. Specifically, the CV taken after the 130th cycle is illustrated by line 82, as after the 200th cycle by line 84. As may be appreciated from a perusal of FIG. 5, the behavior of the material is quite stable upon prolonged cycling.

Example 4

Crosslinked polyacrylamide was prepared by mixing 0.50 g of acrylamide, 0.36 g of N,N'-methylene-bis-acrylamide, 0.032 g of ammonia persulfate and 0.002 g of tetramethylethylenediamine with 50 ml of distilled water in a flask under a nitrogen atmosphere. The mixture was allowed to stir until a clear solution resulted. The solution was poured into a flat glass dish, allowed to gel and the water evaporated. The resulting clear polymer film was soaked in a 30 wt% KOH solution until the weight of the film doubled to approximately 2.0 g. The gel film was 0.26 mm thick and exhibited an ionic conductivity of 0.012 S/cm as measured by ac impedance.

Example 5

Commercially available polyacrylamide powder was pressed into a film using a heated hydrolytic press. The polyacrylamide powder was pressed at 5000 psi at a temperature of 100° C. A 1.0 g piece of the resulting translucent, brittle film was soaked in a 30% KOH solution until the weight of the film doubled to approximately 2.0 g. The tacky, transparent film exhibited an ionic conductivity of 0.04 S/cm as measured by ac impedance.

In an alternative, the pressed polyacrylamide film was placed in 5M $H_2SO_4$. The resulting clear, tacky gel film contained 67 wt% of sulfuric acid and exhibited a ionic conductivity of 0.03 S/cm.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An aqueous electrolyte system for an electrochemical cell, comprising a poly(2-hydroxyethylmethacrylate) film matrix having a KOH electrolyte incorporated thereinto.

2. An electrolyte system as in claim 1, wherein said electrochemical cell is a battery.

3. An electrolyte system as in claim 1, wherein said electrochemical cell is a capacitor.

4. An electrochemical capacitor comprising:
   a nickel alloy first electrode, an antimony-bismuth second electrode and an electrolyte comprising a polymer film matrix selected from the group consisting of polyacrylamide and poly(2-hydroxyethyleneacrylate) and an electrolyte active species.

5. A capacitor as in claim 4, wherein said electrolyte active species is selected from the group consisting of KOH, LiOH, NaOH, $H_2SO_4$, $H_3PO_4$, HCl, and combinations thereof.

6. An electrolyte system for an electrochemical cell comprising an electrolyte active species dispersed in a polymer film matrix fabricated of a polymer selected from the group consisting of poly (2-hydroxypropylmethacrylate), poly (2-hydroxybutylmethacrylate), and combinations thereof.

7. An electrolyte system as in claim 6, wherein said electrolyte active species is selected from the group consisting of KOH, LiOH, NaOH, $H_2SO_4$, $H_3PO_4$, HCl, and combinations thereof.

8. An electrolyte system as in claim 6, wherein said electrochemical cell is a battery.

9. An electrolyte system as in claim 6, wherein said electrochemical cell is a capacitor.

\* \* \* \* \*